United States Patent
Lovering et al.

(10) Patent No.: US 7,965,437 B2
(45) Date of Patent: Jun. 21, 2011

(54) INTEGRATED HIGH EFFICIENCY MULTI-STAGE ACOUSTO-OPTIC MODULATOR

(75) Inventors: David Lovering, Taunton (GB); Darren Chaney, Ilminster (GB)

(73) Assignee: Gooch and Housego PLC, Ilminster, Somerset (GB)

( * ) Notice: Subject to any disclaimer, the term of this patent is extended or adjusted under 35 U.S.C. 154(b) by 148 days.

(21) Appl. No.: 12/097,694

(22) PCT Filed: Jan. 31, 2007

(86) PCT No.: PCT/US2007/002732
§ 371 (c)(1),
(2), (4) Date: Feb. 26, 2009

(87) PCT Pub. No.: WO2007/100433
PCT Pub. Date: Sep. 7, 2007

(65) Prior Publication Data
US 2009/0147344 A1    Jun. 11, 2009

(30) Foreign Application Priority Data
Jan. 31, 2006  (GB) .................................. 0601886.5

(51) Int. Cl.
*G02F 1/11*   (2006.01)
*G02F 1/33*   (2006.01)

(52) U.S. Cl. .......................... 359/285; 359/305; 359/311

(58) Field of Classification Search .................. 359/285, 359/305, 308, 311–312
See application file for complete search history.

(56) References Cited

U.S. PATENT DOCUMENTS
2002/0191264 A1   12/2002 Vernackt et al.
2003/0086447 A1    5/2003 Young et al.
2005/0213617 A1*   9/2005 Gendron ........................ 372/10

FOREIGN PATENT DOCUMENTS
GB   2139842   11/1984

* cited by examiner

*Primary Examiner* — Dawayne A Pinkney
(74) *Attorney, Agent, or Firm* — Jetter & Associates, P.A.

(57) ABSTRACT

An acousto-optic modulator for a Q-switch (300) for a laser includes a monolithic acousto-optic (a-o) medium (311), a series of at least two acoustic transducers (321, 322), bonded spaced apart on the a-o medium, which emit first and second columnar acoustic beams (331, 332). These interact sequentially with an incident optical beam (Light) passing through the modulator. The transducers are oriented so that an optical ray (342) diffracted from the first acoustic column region enters the second acoustic column region at an angle outside the "acceptance angle" of the second acoustical column, i.e. outside the range of incidence angles for which the diffraction efficiency is significant, whereas the remaining light in the zeroth order will undergo further diffraction at the second acoustic column region. This arrangement significantly reduces the amount of light diffracted by the first beam being diffracted back into the zeroth order by the second acoustic beam. The second acoustic beam is arranged to diffract any light remaining in the zeroth order after passing through the first acoustic beam region. In this way the efficiency of the modulator for Q-switching operation is increased. Bragg angle; Raman-Nath diffraction, Debye-Sears-Ratio.

14 Claims, 9 Drawing Sheets

FIGURE 1

PRIOR ART

FIGURE 2

PRIOR ART

INTEGRATED HIGH EFFICIENCY MULTI-STAGE ACOUSTO-OPTIC MODULATOR

FIELD OF THE INVENTION

The invention relates to acousto-optic modulators and related Q-switched lasers.

BACKGROUND

Q-Switching is a frequently used method of providing high intensity pulses from lasers and is conventionally achieved by the use of either electro-optic (EO) or acousto-optic (AO) devices placed inside the laser cavity. Regarding AO Q-switches, sound waves emanating from a biased transducer pair bonded to a crystal travel in a direction which is primarily perpendicular to the laser or other light beam incident on the crystal. This arrangement diffracts the beam passing through a crystal, using travelling acoustic waves. It is well known that the angle of the light beam relative to the sonic wavefront must be at or near the Bragg angle, which is generally a small angle such as less than a few degrees, specifically within the so-called acceptance angle which is centered on the Bragg angle, to obtain such diffraction. The acceptance angle is generally defined as the range of incidence angles for which the diffraction efficiency is greater than 50%.

Whether AO or EO-based, Q-switch laser devices are switched OFF (low optical transmission, high loss state) for a period in which the population inversion of the gain medium is pumped to a high value and then rapidly turned ON (high transmission, low loss state). During the OFF phase, the laser is operating below the laser threshold as the cavity loss is too great. During the ON phase, the cavity loss is suddenly reduced to a low value allowing laser operation. A large output optical pulse then results as the stored energy in the laser gain medium is released.

Improvements in laser technology in recent years have meant that the 80-85% loss modulation provided by current Q-Switch devices is sometimes insufficient to hold off modern lasers, thus being insufficient to completely prevent them from oscillating. One solution well known within the laser and acousto-optics industry to achieve higher loss modulation in laser cavities utilizes two or more spaced apart Q-Switches optically coupled in series. The second Q-Switch is used to further reduce the zero-order (undiffracted) intensity residual transmitted by the first Q-Switch.

The use of multiple spaced apart AO Q-Switches does not always provide the increase in loss modulation that might be expected. This is because the modulator Debye-Sears ratio and acceptance/separation angles have an effect on the overall efficiency of the system, and this is not always realised. When the Debye-Sears ratio (Q) is large and the Q-Switches operate in the Bragg regime, there are two possible device orientations.

Figure 1:
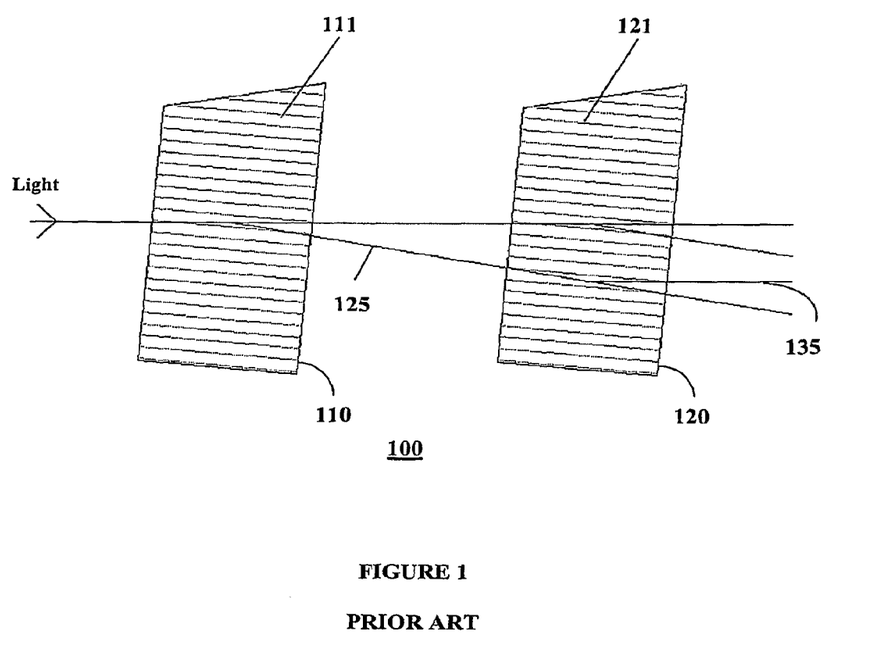
FIG. 1 shows two spaced apart conventional Q-Switches aligned at the Bragg angle with the acoustic wave fronts parallel to each other. The diagram is drawn with light traveling from left to right for simplicity only as the device is required to be bi-directional. The diffracted ray from the first device is presented to the second device at the Bragg angle and is re-diffracted. As a result, undesirable efficient re-diffraction of the first order beam back towards the zero order will occur.

As shown in FIG. 1, a first orientation conventional double Q-Switch device 100 is shown wherein the acoustic wave fronts 111 and 121 from each switch are aligned parallel to one another. The diffracted ray 125 emerging from the first Q-switch device 110 is then presented to the second Q-switch device 120 precisely at the Bragg angle. If the diffracted ray 125 falls on the active aperture of the second device 120, efficient re-diffraction of the first order beam back towards the zero order 135 will occur. In this case, it is possible for Q-Switches 110 and 120 coupled in series to be less efficient than a single Q-Switch, such as Q-switch 110 alone.

Figure 2:
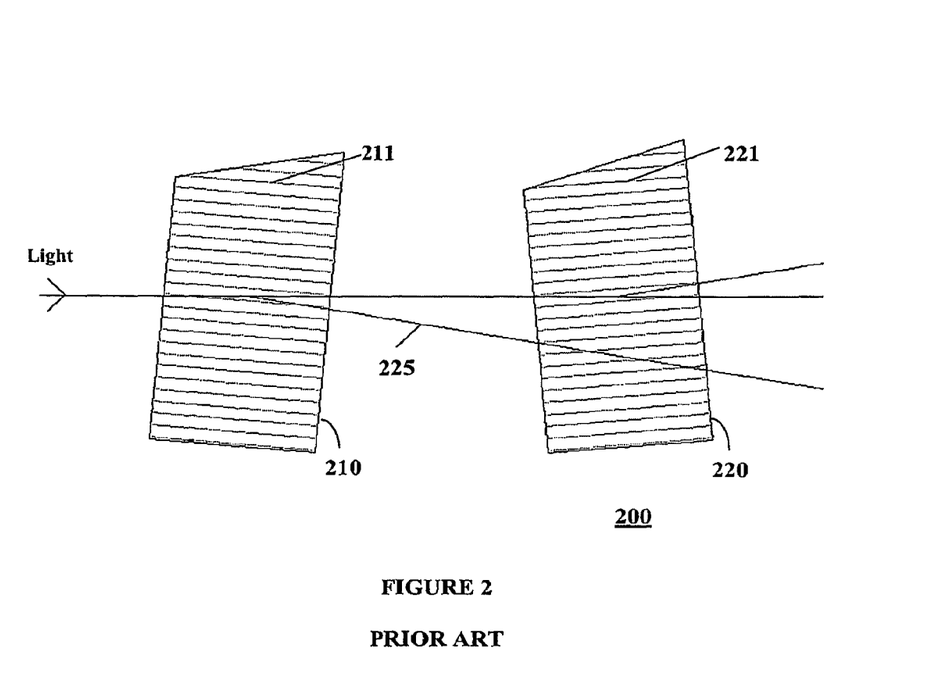
FIG. 2 shows two spaced apart Q-Switches aligned at the Bragg angle with the acoustic waves not being parallel to one another. Light travels from left to right. The diffracted ray from the first device can only be re-diffracted by the second device if it is within the acceptance angle.

FIG. 2 shows a second orientation for a double Q-switch device 200, comprising Q-switch devices 210 and 220. The respective Q-Switches 210 and 220 are aligned such that the zero order beams enter each device at the Bragg angle ($\theta_B$), but the devices 210 and 220 are oriented such that the respective acoustic waves 211 and 221 are not parallel to one another. In this case the diffracted beam 225 from the first device 210 falls on the second device 220 at a non-Bragg angle, such as an angle of $3\theta_B$. If this diffracted beam 225 is within the acceptance angle of the second device (which as noted above is centered on the Bragg angle), the first order beam 225 can be re-diffracted towards the zero order (not shown) and the overall efficiency of the device 200 reduced. This can be a problem with multiple low frequency spaced apart Q-Switches arranged in series.

Relative orientation of the respective Q-switches comprising device 100 or 200 is thus crucial since any rediffraction of the first order rays back into the zeroth order by the second Q-Switch will significantly reduce the loss modulation. Rediffraction is not the only drawback associated with using two separate Q-switches. The relative phase of the acoustic modulation must also be considered if timing jitter is to be avoided. The increase in cavity length associated with fitting two Q-switches results in an increase in pulsewidth. Moreover, two spaced apart Q switches will place four optical faces into the laser cavity leading to increased insertion loss and multiple reflections. Two Q switches also require extra plumbing for the water cooling system and RF drivers. Finally, each Q-switch must be carefully aligned at the Bragg angle while simultaneously avoiding rediffraction losses, which is often not possible.

What is needed is a robust Q-Switch design which provides short pulse widths and a loss modulation greater than the 80-85% loss modulation provided by current Q-Switch devices so that the loss produced is sufficient to hold off modern high cavity gain lasers, thus being sufficient to prevent oscillation.

SUMMARY

An acousto-optic modulator comprises a monolithic acousto-optic medium, a plurality of spaced apart acoustic transducers comprising a first and at least a second transducer both bonded and positioned on the monolithic acousto-optic medium to form first and second acoustical columns. The first and second transducers are aligned so that an incident optical beam encounters the acoustical beam produced by each of the transducers sequentially on its passage through the modulator. The transducers are oriented so that a diffracted ray from the first acoustical column enters the second acoustical column at an angle outside the acceptance angle of the second acoustic column.

Some definitions of terms used herein are now presented:

The acceptance angle ($\theta_a$), which is a device specific parameter, is defined as the angular distance between first order zeros of a sin $c^2$ function centered on the Bragg angle ($\theta_B$).

The Bragg angle ($\theta_B$) is based on Bragg's law of x-ray crystallography, $n\lambda = 2d \sin \theta_B$, where n is an integer, $\lambda$ is the wavelength of a beam of x-rays incident on a crystal with lattice planes separated by distance d, and $\theta_B$ is the Bragg angle.

The "Raman-Nath diffraction regime" is defined as follows:

The Raman-Nath diffraction regime occurs when $$Q = \frac{2\pi \lambda l f^2}{nv^2} \ll 1,$$

where $\lambda$ is the optical wavelength, l is the interaction length, f is the acoustic frequency, n is the refractive index and v is the acoustic velocity. The Raman-Nath regime is characterized by the incident light beam being diffracted into many orders.

The Bragg regime occurs when $Q \gg 1$. In the Bragg regime, light is diffracted into a single order.

Modulators according to the invention can provide at least a 90% single pass peak loss modulation. In one embodiment, the transducers are oriented so that an incident angle of an emerging optical beam from the first acoustical column relative to the second acoustical column is such that the condition $\theta_a \leq 4\theta_B$ is satisfied, wherein $\theta_a$ is the acceptance angle and $\theta_B$ is the Bragg angle. In this embodiment, an incident angle of the emerging optical beam relative to the second optical column can pass through one of the zeros in the $\sin c^2$ function that defines the acceptance angle.

In another embodiment, the modulator further comprises a third transducer disposed between the first and second transducer bonded to the AO medium to form a third acoustical column. The first and second acoustical columns are aligned to operate in the Bragg regime, while the third column is aligned to operate in the Raman-Nath regime. In yet another embodiment, the modulator further comprises a third and a fourth transducer bonded to the AO medium to form a third and fourth acoustical column, wherein all the acoustical columns operate substantially in the Bragg regime.

The acousto-optic medium can comprise amorphous materials, such as amorphous silica. In another embodiment, the acousto-optic medium comprises a single crystal, such as tellurium dioxide, quartz or silicon.

A Q-switched laser comprises a resonator cavity comprising a high reflecting back mirror, a partially reflecting output coupler, an amplifying laser material between the back mirror and the output coupler, and an acousto-optic modulator disposed on either side of the amplifying material between the back mirror and output coupler. The modulator comprises a monolithic acousto-optic medium, a plurality of spaced apart acoustic transducers comprising a first and at least a second transducer both bonded and positioned on the monolithic acousto-optic medium to form first and second acoustical columns. The first and second transducers are aligned so that an incident optical beam encounters the acoustic beam produced by each of the transducers sequentially on its passage through the modulator, wherein the transducers are oriented so that a diffracted ray from the first acoustical column enters the second acoustical column at an angle outside the acceptance angle of the second acoustical column. The modulator can provide at least a 90% single pass peak loss modulation.

BRIEF DESCRIPTION OF THE DRAWINGS

A fuller understanding of the present invention and the features and benefits thereof will be accomplished upon review of the following detailed description together with the accompanying drawings, in which.

DETAILED DESCRIPTION OF THE INVENTION

The need for enhanced loss modulation and the disadvantages that arise from using conventional multi-stage spaced apart serially coupled Q-Switches noted below have led the present inventors to design and build a new type of acousto-optic (AO) modulator device, referred to herein as an integrated "Very High Efficiency" (VHE) Q-Switch, as a VHE-Q-Switch, or as an AO modulator according to the invention. An AO modulator according to the invention comprises a monolithic acousto-optic medium, and a plurality of spaced apart acoustic transducers comprising a first and at least a second transducer both bonded to the monolithic acousto-optic medium to form first and second acoustical columns. An incident optical beam encounters the acoustic beam produced by each of the transducers sequentially on its passage through the modulator, wherein the transducers are aligned so that a diffracted ray from the first acoustical column enters the second acoustical column at an angle within the acceptance angle of the second acoustical column. As a result, the diffraction induced loss obtained is significantly greater than the diffraction induced loss obtainable with a single transducer, such as $\geq 90\%$ single pass peak loss modulation. The monolithic AO medium can be amorphous fused silica, or certain single crystal materials, such as silicon, tellurium dioxide or quartz.

The rediffraction problem that plagues conventional multiple spaced apart Q-switch designs which results in reductions in loss modulation, such as Q-Switches 100 and 200 described in the background, has been solved by careful alignment of the acoustics within a single monolithic structure. At certain incidence angles, a laser or other optical beam will not be diffracted by the acoustic beam. These angles are built into the VHE Q-Switch to ensure that no significant light is diffracted back into the zeroth order.

Figure 3:
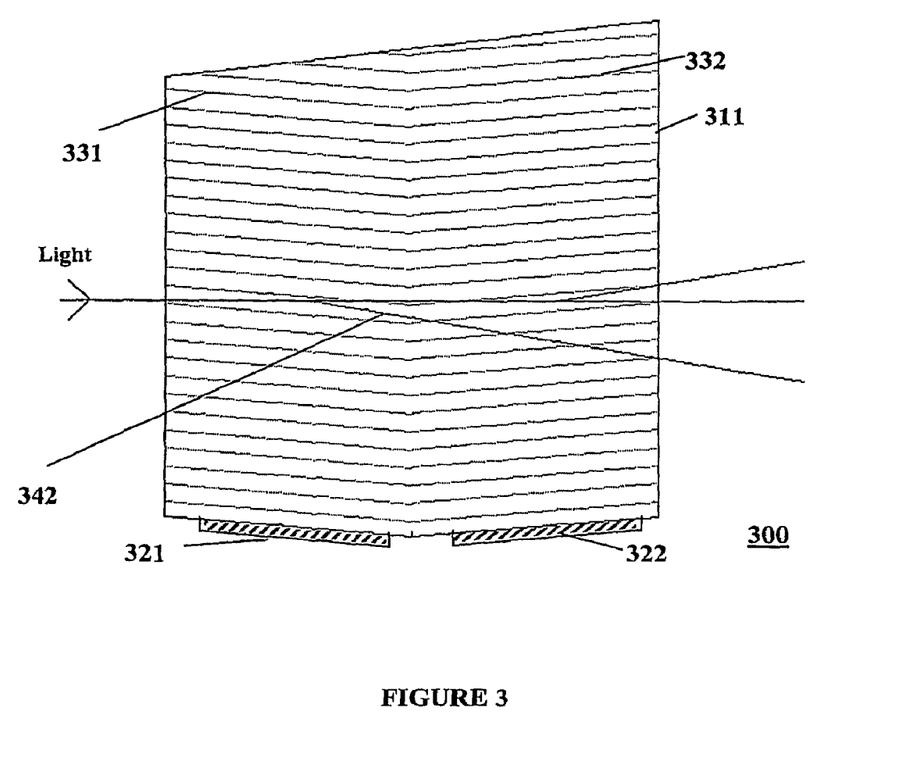
FIG. 3 shows an exemplary integrated two stage very high efficiency (VHE) Q-Switch according to an embodiment of the invention. Light is shown traveling from left to right. Two transducers are bonded to the angled faces at the bottom of the cell, producing two non-parallel acoustic beams.

In the following section, a particular embodiment of the invention is described, that of an integrated two-transducer AO modulator configured as a laser Q-Switch, as illustrated in FIG. 3. It will be apparent to those skilled in the art how this embodiment may be generalized to include transducer designs having three (3) or more transducers bonded to a single AO crystal for the purpose of obtaining increased loss modulation. Exemplary three (3) and four (4) transducer VHE Q-Switch designs according to the invention are also described below.

As noted above, if the Debye-Sears ratio of an acousto-optic modulator is low, (generally taken to mean Q<5)), an AO device will operate in the so-called Raman-Nath diffraction regime. The diffracted orders emergent from the first device can be undesirably re-diffracted toward the zero order by the second device provided the acceptance angle of the second Q-Switch is large enough. In this case the zero-order intensity is not reduced by as large a factor as might have been expected.

In order to maximise the loss modulation efficiency of the two transducer (double-section) Q-Switch system it is necessary to effectively remove the possibility of rays being re-diffracted into zero-order (the incident beam) by the second Q-Switch. The first order rays could be blocked from entering the second Q-Switch using a simple beam stop. However, the small deflection angle makes this arrangement difficult to implement without hindering the normal operation of the laser. Devices according to the present invention instead ensure the diffracted ray from the first device enters the second Q-Switch (acoustical column) at an angle outside the acceptance angle of the second Q-Switch, so the percentage of the beam being re-diffracted is low.

As described below, VHE Q-Switches according to the invention require a very a specific set of criterion to ensure diffracted light from one acoustic column is essentially non re-diffractable by the subsequent column in order to provide the desired ≧90% single pass peak loss modulation. A thorough knowledge of the physics involved in the acousto-optic interaction was used by the present Inventors to define the required design and critical alignment parameters. Regarding alignment, the present Inventors have found that the critical alignment of the acoustic fields is best accomplished by integration of the multi-stage modulator using a single AO crystal medium. Precise processing (e.g. polishing for an amorphous medium) of the transducer faces of the respective AO cells is generally required to obtain the correct angles necessary.

Producing loss efficient VHE Q-Switches according to the invention has been found to be challenging due to the precision polishing and unique design parameters needed for efficient operation. For example, any measurable deviation from the precise relationship between transducer length and frequency will result in a significant reduction in loss efficiency. For example, re-diffraction of light back into the zero order will result in a loss modulation less than that provided by a single traditional Q-Switch.

FIG. 3 shows an exemplary integrated two-stage very high efficiency (VHE) Q-Switch 300 according to an embodiment of the invention. Light is shown travelling from left to right. Q-Switch 300 is built using a single monolithic AO medium 311. Q-Switch 300 includes spaced apart piezoelectric transducers 321 and 322 which are bonded to the angled faces at the bottom of the AO medium 311 which define first and second Q-Switches having associated acoustical columns. Transducers 321 and 322 are sandwiched between top and bottom electrodes (electrodes not shown here, or hereafter, but understood to be present). When transducers 321 and 322 are biased by a suitable RF signal source, acoustical columns defined by transducers provide two non-parallel acoustic beams 331 and 332, respectively. As shown in FIG. 3, the diffracted ray 342 from the first device enters the second Q-Switch (acoustical column) at an angle outside the acceptance angle of the second Q-Switch, and is thus shown as not being re-diffracted.

One advantage of devices according to the present invention is the ability to easily implement a single RF driver. In this embodiment, by electrically coupling an electrode of one switch to an electrode of another switch, a single RF driver signal can be used thus eliminating timing jitter and phase mismatch between the respective Q-Switches. By electrically linking the electrodes together, the transducers will be inherently synchronized, as they will be supplied from a common RF driver. In contrast, if separate RF drivers are used, then it will be more difficult to synchronize them (i.e. make sure they are operating at exactly the same frequency and phase), and this can result in undesirable jitter.

An exemplary system according to the present invention comprising two identical Q-Switches formed on a common AO medium, such as Q-Switch 300 shown in FIG. 3, will now be described. By considering the phase mismatch factor for the diffraction efficiency in an isotropic medium relationship between the Debye-Sears ratio and the acceptance angle can be found. From the book "Acousto-Optic Devices—Principles, Designs and Applications" by Jieping Xu and Robert Stroud, Wiley (1991), the phase mismatch factor is given by:

$$I_d = \left[\frac{2\sin(\Delta k_m L/2)}{\Delta k_m L}\right]^2 = \mathrm{sinc}^2\left(\frac{\Delta k_m L}{2}\right) \quad (1)$$

where $$\Delta k_m = \frac{mK}{\cos\theta_i}\left[\frac{mK}{2k} - \sin\theta_i\right], \quad (2)$$

K is the acoustic wave number, k is the optic wave number, m is the order of diffraction and $\theta_i$ is the angle of incidence. The internal acceptance angle is defined herein as the range of incidence angles for which the diffraction efficiency is greater than 50%, i.e. the Full Width Half Maximum (FWHM) of $I_d$ as a function of $\theta_i$. The argument of the sin c function in equation (1) may be written as:

$$\delta\pi = \frac{\Delta k_m L}{2} = \pi\left[\frac{\lambda L f_{RF}^2}{2v^2 n\cos\theta_i} - \frac{L f_{RF}}{v}\tan\theta_i\right] = Q\left[\frac{1}{2\cos\theta_i} - \frac{nv}{2 f_{RF}\lambda}\tan\theta_i\right]. \quad (3)$$

Clearly, the Debye-Sears ratio (Q) has an effect on the acceptance angle in that a large Q value will produce a small acceptance angle and vice versa. Using small angle approximations, which are usually valid for AO devices, equation (3) can be solved for the angle of incidence:

$$\theta_i \approx \frac{\lambda f_{RF}}{2vn} - \frac{\delta v}{f_{RF}L}. \quad (4)$$

Hence the acceptance angle, which is centered on the Bragg angle, is given by:

$$\theta_{acc} = |\theta_{i=+|\delta|} - \theta_{i=-|\delta|}| \approx \frac{2|\delta|v}{f_{RF}L}. \quad (5)$$

The acceptance angle, when defined as the FWHM of the sin c function of equation (1) is given when $\delta=0.44296$.

The Bragg angle can also be written in terms of the Debye-Sears ratio.

$$\theta_B = \sin^{-1}\left(\frac{\lambda f}{2nv}\right) = \sin^{-1}\left(\frac{Qv}{4\pi L f_{RF}}\right). \quad (6)$$

The Bragg (deflection) angle is independent of the interaction length (L), but the acceptance angle is dependent on the interaction length (L). The optical wavelength and acoustic velocity are parameters that are fixed by the application of the device. The only parameter generally available to maximise the deflection angle is the RF drive frequency ($f_{RF}$). Since the acceptance angle is proportional to $f_{RF}^{-1}$ increasing the drive frequency will also have the effect of narrowing the acceptance angle. Hence, by increasing the drive frequency, the amount of light re-diffracted by the second Q-Switch can be minimised and the efficiency of a two stage non-parallel Q-Switch system can be increased. Accordingly, frequency selection is generally a compromise between aperture and ability to prevent re-diffraction, high enough to significantly prevent re-diffraction, low enough to retain useful acceptance angle. Exemplary devices described below have been found to operate well at 68 MHz, for example.

For optimal efficiency, the diffracted order from the first Q-Switch should enter the second Q-Switch at an angle such that none (e.g. <1%) of the light can be re-diffracted. Light entering the device at an angle that corresponds to $I_d=0$ in equation (1) will achieve this and this occurs when $\delta=\pm m$ where m is an integer. Geometric considerations for the relationship between the Bragg angle and the acceptance angle show that for small re-diffraction of the first order beam the condition $4\theta_B > \theta_{acc}$ must be met. This condition can be made an equality if one considers the angles of incidence where $I_d$ is zero. Using equations (5) and (6) the following relationship is arrived at:

$$\frac{2\lambda f_{RF}}{nv} = \frac{2mv}{f_{RF}L} \quad (7a\ \&7b)$$

or $$f_{RF}^2 L = \frac{v^2 mn}{\lambda}$$

The left hand side of equation 7(b) are RF frequency ($f_{RF}$) and transducer length (L), which are both free design parameters during the design process. The right hand side contains the sound velocity (v), the refractive index (n) and the optical wavelength ($\lambda$), which are application dependent parameters. Based on the above, it should be clear that devices according to the invention can be arranged so that essentially none of the $1^{st}$ order rays are re-diffracted by the second Q-Switch, or subsequent Q-Switches.

A prototype integrated 2-stage VHE Q-Switch according to the present invention is calculated to have a Debye-Sears ratio of 12.6 for each acoustic beam, an external Bragg angle of 6.07 mrad and an external acceptance angle of 5.63 mrad. This easily conforms to the requirement that $\theta_{acceptance} < 4\theta_B$ to be sure that the diffracted beam from the $1^{st}$ acoustic wave column does not get re-diffracted by the second acoustic weave column to any significant degree. The amount of re-diffracted light can be estimated by substituting the angle $4\theta_B$ for $\theta_i$ in equation (3) and calculating where the Bragg angle falls within the sin c function of the phase mismatch factor. For a prototype 2-stage VHE Q-Switch, such as Q-Switch 300 shown in FIG. 3. it is found that $\delta$2.86, meaning that the Bragg angle falls very near to the third zero in the sin c function. In this case, about 0.2% of the first order light is calculated to be re-diffracted into the zero order by the second acoustic beam.

Although similar in size to an "industry standard" Q-Switch, a two acoustic column Q-Switch according to the invention operating at 68 MHz, was found to produce a measured loss modulation of nearly 97% compared with 80-85% for a single Q-Switch. This enhanced loss modulation is achieved in part by using more RF drive power, which is quadrupled (peak loss modulation is expected at 69.3 W RF power) relative to a standard single element Q-Switch (peak loss modulation at 17.3 W RF power).

Multi-Acoustic Column Zero-Order AO Device Configurations

Hybrid Bragg/Raman-Nath Three Column Design

Figure 4:
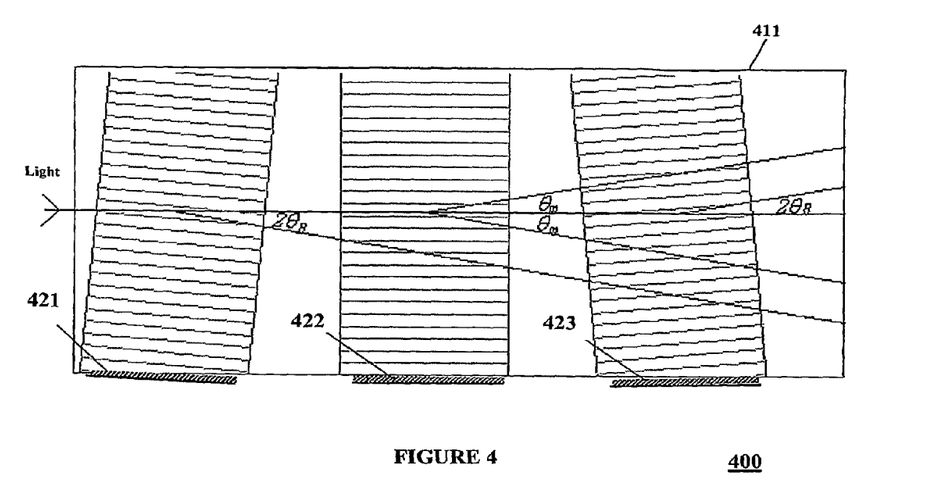
FIG. 4 shows an exemplary integrated three (3) column hybrid Bragg/Raman-Nath VHE Q-Switch design according to an embodiment of the invention. The diagram is drawn with light traveling from left to right for simplicity, but the device is required to be bi-directional. The first and third columns are aligned to operate in the Bragg regime. The second column is aligned to operate in the Raman-Nath regime.

To extend the two acoustic column Q-Switch according to the invention described above relative to FIG. 3, additional acoustic columns can be added in series as illustrated by Q-Switch 400 shown in FIG. 4. FIG. 4 shows an exemplary integrated three (3) acoustical column hybrid Bragg/Raman-Nath design. The diagram is drawn with light traveling from left to right for simplicity, but the device is required to be bi-directional. Q-Switch 400 utilizes a common AO medium 411. Q-Switch 400 includes transducers 421, 422 and 423, which each define Q-Switches having associated first, second and third acoustical columns, respectfully. The first and third columns are aligned to operate in the Bragg regime, while the second column is aligned to operate in the Raman-Nath regime, for reasons described below.

A problem arises when the acoustic wave fronts of two identical acoustic columns are aligned parallel to each other as noted above relative to FIG. 1. Specifically, the diffracted ray emerging from the first column is then presented to the second column precisely at the Bragg angle. In this case undesirable efficient re-diffraction of the first order beam back towards the zero order will occur. This is the problem that led the present inventors to develop the non-parallel system used in the two acoustic column Q-Switch according to the invention shown in FIG. 3.

As shown in FIG. 4, to avoid re-diffraction of the first order beam back towards the zero order, the second acoustic column operating in the Raman-Nath diffraction regime is inserted between the first and third Bragg columns. Generality will be maintained in the description below by allowing the Bragg and Raman-Nath columns to operate at different RF frequencies by denoting f as the frequency of the Raman-Nath column and f' as the frequency of the Bragg columns.

The condition for no re-diffraction for the two Bragg regime columns is:

$$\frac{f'^2 L'}{\delta'} = \frac{nv^2}{\lambda} \quad (9)$$

where $\delta'$ is a positive integer.

Considering a light ray travelling from the middle to the right hand column of FIG. 4, geometric considerations lead to the relationship $\theta_i = \theta_m + \theta_B$ for the lower (m=−1) branch and $\theta_i = \theta_m - \theta_B$ for the upper (m=+1) branch. The expression for the Raman-Nath deflection angle is given by:

$$\theta_m = \frac{m\lambda f}{nv} \quad (10)$$

where m is an integer labelling the Raman-Nath diffracted order. From the angles of incidence discussed above and equations (5, 6 & 7), the following relations are found:

$$\frac{m f f' L'}{\delta_\beta} = \frac{nv^2}{\lambda} \quad (11)$$

and $$\frac{f' L}{\delta_\alpha} |mf - f'| = \frac{nv^2}{\lambda} \quad (12)$$

Comparing equations (9 & 11) it is seen that:

$$f' = \frac{\delta' m f}{\delta_\beta} \quad (13)$$

It is desirable to design the device such that none of the m (Raman-Nath) diffracted orders are re-diffracted by the Bragg column, so let $\delta_\beta$=m which gives f'=$\delta$'f. Comparing equations (11 & 12) it is found that:

$$|m - \delta'| = \delta_\alpha \quad (14)$$

$\delta'$ must generally be fixed due to the frequency requirements found from equation (13). This means that $\delta_\alpha$ will be zero when m=$\delta'$ and efficient re-diffraction of the $\delta'$ order will occur.

It has been found that it is impossible to completely eliminate the re-diffraction of all m-order rays. In practice, one can only choose the single order that will be re-diffracted so that the intensity of that order is low. Practical limitations on the achievable frequencies place an upper limit of $\delta'=3$ so that the m=+3 order Raman-Nath diffracted beam will be re-diffracted toward the zero order by the next Bragg acoustic column.

If $\delta'=2$, then the m=2 order will contain ~24% of the incident light and will be re-diffracted efficiently by the next acoustic column. Assuming the diffraction efficiency of each acoustic column is 80%, it is found that the overall loss modulation of the design is 95.36%. Increasing $\delta'$ to 3, only increases the loss modulation to 96.32%.

Bragg Four Acoustic Column VHE-Q-Switch Design

Figure 5:
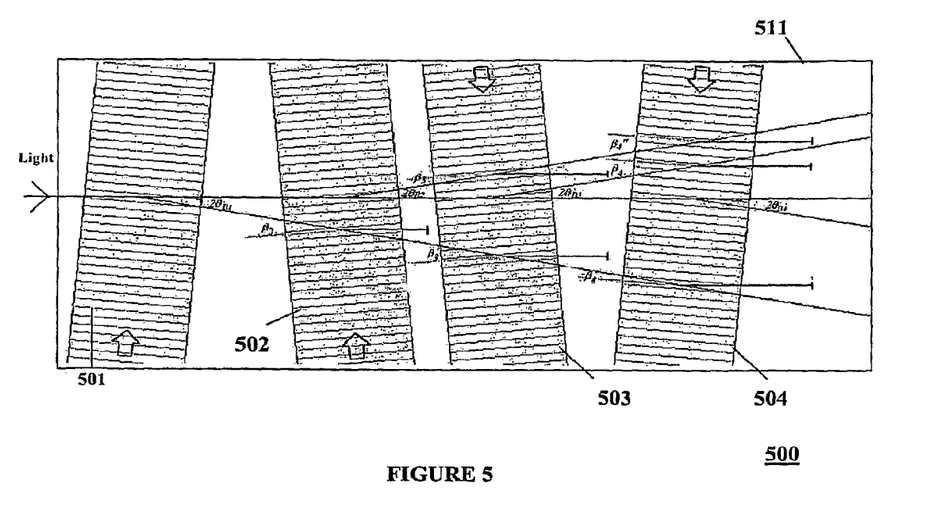
FIG. 5 shows an exemplary integrated four (4) column Bragg VHE Q-Switch design according to an embodiment of the invention. The diagram is drawn with light traveling from left to right for simplicity but the device is required to be bi-directional. All columns are aligned to operate in the Bragg regime. Acoustic columns are labeled 501-504 from left to right.
Figure 6:
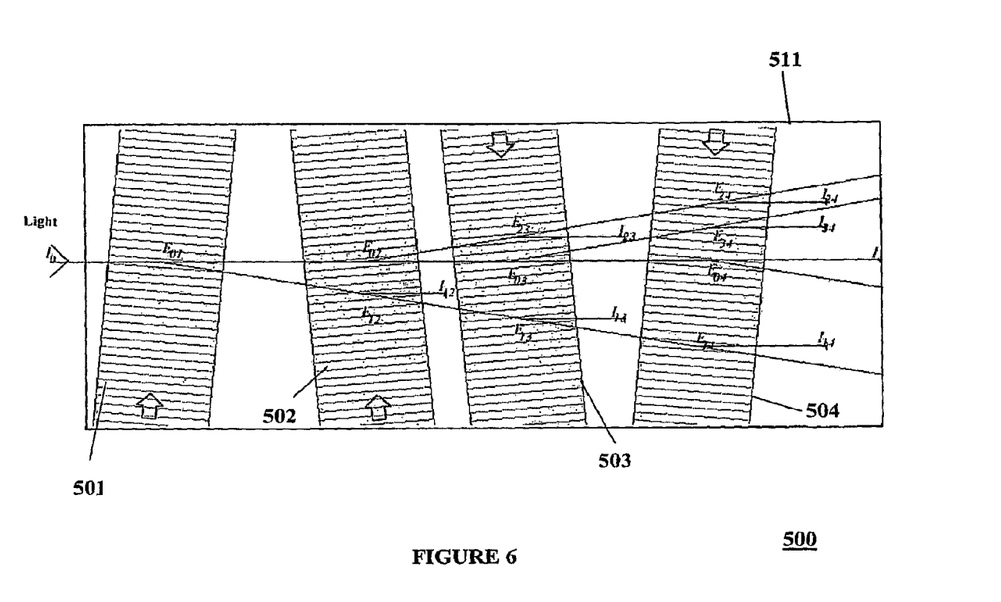
FIG. 6 illustrates the diffraction efficiency for the 4 column Bragg VHE Q-Switch design shown in FIG. 5.

FIG. 5 shows an exemplary Q-Switch 500 comprising 4 acoustic columns formed using the same acousto-optic cell 511. Light is shown to travel from left to right for simplicity, although the device must generally be bi-directional. Acoustic columns are labeled 501-504 from left to right. Transducers defining the respective acoustical columns are not explicitly shown, but are present at the ends closest to the base of arrows shown in the Fig., wherein the arrows represent acoustic energy flowing from the transducers. In general, however, the transducers could be at either end of the acoustic columns in any combination, with appropriate changes in acoustic direction shown by changes in arrow directions because for the present invention it generally does not matter which direction a particular acoustic wave moves, so the particular set of transducer placing can be chosen for ease of mechanical construction. FIG. 6 is a diffraction efficiency diagram for a 4 column Bragg VHE-Q-Switch design shown in FIG. 5.

The condition for incident beams not diffracting in an acoustic column is given by equation (15) where the acceptance angle is given by equation (5) with $\delta$ a non-zero integer.

$$\theta_i = \theta_B \pm \frac{\theta_a}{2} \quad (15)$$

From geometric considerations it can be found that the angle of incidence in terms of Bragg angles for each acoustic column is:

$$\beta_2 = 2\theta_{B1} + \theta_{B2} \quad (16)$$
$$\beta_3 = 2\theta_{B2} + \theta_{B3}$$
$$\beta'_3 = 2\theta_{B1} + \theta_{B3}$$
$$\beta_4 = 2\theta_{B3} + \theta_{B4}$$
$$\beta'_4 = 2\theta_{B1} + \theta_{B4}$$
$$\beta''_4 = 2\theta_{B2} + \theta_{B4}$$

equation (15) can be written in terms of the Bragg angle for each acoustic column and with equations (5, 7 & 16) the condition expressed in equation (17) can be arrived at:

$$\frac{f_1 f_2 L_2}{v_1 v_2 \delta_{12}} = \frac{f_1 f_3 L_3}{v_1 v_3 \delta_{13}} = \frac{f_4 L_4}{v_4 \delta_{14}} \left| \frac{f_1}{v_1} - \frac{f_4}{v_4} \right| = \frac{f_3 L_3}{v_3 \delta_{23}} \left| \frac{f_2}{v_2} - \frac{f_3}{v_3} \right| = \quad (17)$$
$$\frac{f_2 f_4 L_4}{v_2 v_4 \delta_{24}} = \frac{f_3 f_4 L_4}{v_3 v_4 \delta_{34}} = \frac{f_1 f_2 L_1}{v_1 v_2 \delta_{21}} = \frac{f_1 f_3 L_1}{v_1 v_3 \delta_{31}} = \frac{f_1 L_1}{v_1 \delta_{41}} \left| \frac{f_4}{v_4} - \frac{f_1}{v_1} \right| =$$
$$\frac{f_2 L_2}{v_2 \delta_{32}} \left| \frac{f_3}{v_3} - \frac{f_2}{v_2} \right| = \frac{f_2 f_4 L_2}{v_2 v_4 \delta_{42}} = \frac{f_3 f_4 L_3}{v_3 v_4 \delta_{43}} = \frac{n}{\lambda}$$

where $\delta_{ij}$ relates to a light ray emerging from the i-th acoustic column and being re-diffracted in the j-th acoustic column, $f_i$ is the i-th acoustic frequency, $L_i$ is the i-th transducer length and $v_i$ is the i-th acoustic velocity. The acoustic velocity can be kept separate in this way to allow for the use of compressional (longitudinal) and shear transducers in any configuration.

Inspecting equation (17) the following relations are found:

$$f_2 = \frac{n v_1 v_2 \delta_{21}}{f_1 L_1 \lambda} \quad (18)$$
$$f_3 = \frac{v_3 \delta_{31}}{v_2 \delta_{21}} f_2$$
$$f_3 = \frac{v_4 \delta_{43}}{v_1 \delta_{13}} f_1$$

and

-continued $$L_1 = \frac{n\delta_{41}v_1^2}{\lambda f_1^2}\left|\frac{\delta_{42}}{\delta_{12}} - 1\right|^{-1} \quad (19)$$

$$L_2 = \frac{n\delta_{32}v_2^2}{\lambda f_2^2}\left|\frac{\delta_{31}}{\delta_{21}} - 1\right|^{-1}$$

$$L_3 = \frac{n\delta_{23}v_3^2}{\lambda f_3^2}\left|\frac{\delta_{21}}{\delta_{31}} - 1\right|^{-1}$$

$$L_4 = \frac{n\delta_{14}v_4^2}{\lambda f_4^2}\left|\frac{\delta_{12}}{\delta_{42}} - 1\right|^{-1}$$

$f_1$ may be arbitrarily chosen to suit a given application. For strict no re-diffraction, the following relations are found:

$$\frac{\delta_{13}}{\delta_{12}} = \frac{\delta_{43}}{\delta_{42}} = \frac{\delta_{23}}{\delta_{32}} \text{ where } \delta_{13} \neq \delta_{43} \text{ and } \delta_{12} \neq \delta_{42} \quad (20)$$

$$\frac{\delta_{21}}{\delta_{24}} = \frac{\delta_{41}}{\delta_{14}} = \frac{\delta_{31}}{\delta_{34}} \text{ where } \delta_{21} \neq \delta_{31} \text{ and } \delta_{34} \neq \delta_{24}$$

Unfortunately, there are no solutions to equation (17) at least as far as $\delta_{ij}=8$ for which equation (20) holds true. Beyond this, transducer lengths and RF frequencies are not generally within reasonable current manufacturing limits. However, equation (17) can be solved by calculating a set of parameters from equations (18 & 19) using integer values of $\delta_{ij}$ and deduce the remaining unknown (possibly non-integer) $\delta_{ij}$'s by substituting the lengths and frequencies back into equation (15). It can then be found that all values of $\delta_{ij}$ are integers. From FIG. 6 it can be deduced that the intensity of the diffracted light can be written as:

$$I_{12} = I_0 E_{01} E_{12} \quad (21)$$
$$I_{23} = I_0(1 - E_{01})E_{02}E_{23}$$
$$I_{13} = I_0 E_{01}(1 - E_{12})E_{13}$$
$$I_4 = (1 - E_{01})(1 - E_{02})(1 - E_{03})(1 - E_{04})$$
$$I_{24} = I_0(1 - E_{01})E_{02}(1 - E_{23})E_{24}$$
$$I_{34} = I_0(1 - E_{01})(1 - E_{02})E_{03}E_{34}$$
$$I_{14} = I_0 E_{01}(1 - E_{12})(1 - E_{13})E_{14}$$

The diffraction efficiency for re-diffracted beams depends on the incidence angle relative to the Bragg angle and is given by the relationship:

$$E_{ij} = E_{0j}\sin c^2(\pi\delta_{ij}) \quad (22)$$

The loss modulation can then be calculated by summing over all $I_{ij}$'s parallel to the zero order. Using this method there are many parameter values that will give an estimated diffraction efficiency of ~99%. For example:

| | Acoustic Column | | | |
|---|---|---|---|---|
| | 1 | 2 | 3 | 4 |
| RF frequency (MHz) | 27.12 | 27.12 | 54.24 | 54.24 |
| Transducer length (mm) | 65.82 | 65.82 | 32.91 | 32.91 |
| RF power (W) | 5.51 | 5.51 | 11.03 | 11.03 |
| Overall length (mm) | | | | 197.45 |
| Total RF power (W) | | | | 33.08 |
| Estimated loss modulation (%) | | | | 99.84 |

| | Acoustic Column | | | |
|---|---|---|---|---|
| | 1 | 2 | 3 | 4 |
| RF Frequency (MHz) | 40.68 | 40.68 | 81.36 | 81.36 |
| Transducer length (mm) | 29.25 | 29.25 | 14.63 | 14.63 |
| RF Power (W) | 12.40 | 12.40 | 24.81 | 24.81 |
| Overall length (mm) | | | | 87.76 |
| Total Power (W) | | | | 47.43 |
| Estimated loss modulation (%) | | | | 99.84 |

Regarding fabrication of VHE Q-Switches according to the invention, transducers are preferably aligned by polishing the transducer face of the AO cell (such as amorphous fused silica or quartz) to the correct angles. When the transducers are bonded to the AO cell, they will produce an acoustic column perpendicular to this face. Regarding transducer spacing, transducer spacing can vary since the only general requirement is that the acoustic columns should not overlap, otherwise, transducer spacing is generally irrelevant. Thus, only the relative angle which is fixed by the Bragg angle is generally important.

Although generally described using an amorphous AO materials, such as amorphous silica, Q-switches according to the present invention can utilize single crystal materials. Single crystal materials can include tellurium dioxide, quartz or silicon.

As noted above, Q-switches according to the invention generally provide better than 90% single pass loss modulation, and in some cases >95%, as compared with around 85% from the best conventional Q-Switch designs currently available. Such performance can be achieved inside the industry-standard package which allows simple integration into existing cavity configurations. Q-switches according to the invention greatly simplify the alignment procedure. As noted above, Q-switches according to the invention can use a single RF driver so timing jitter from a phase mismatch between two Q-switches is eliminated.

Q-switches according to the present invention are invention especially suited to lasers in which the laser cavity gain is particularly high and lasing can not easily be held off by a single conventional Q-switch. For example, Q-switches according to the present invention are expected to be particularly useful for high-gain, high-power, lasers, such as linearly polarised Nd:YAG and Nd:YVO$_4$ lasers.

Figure 7:
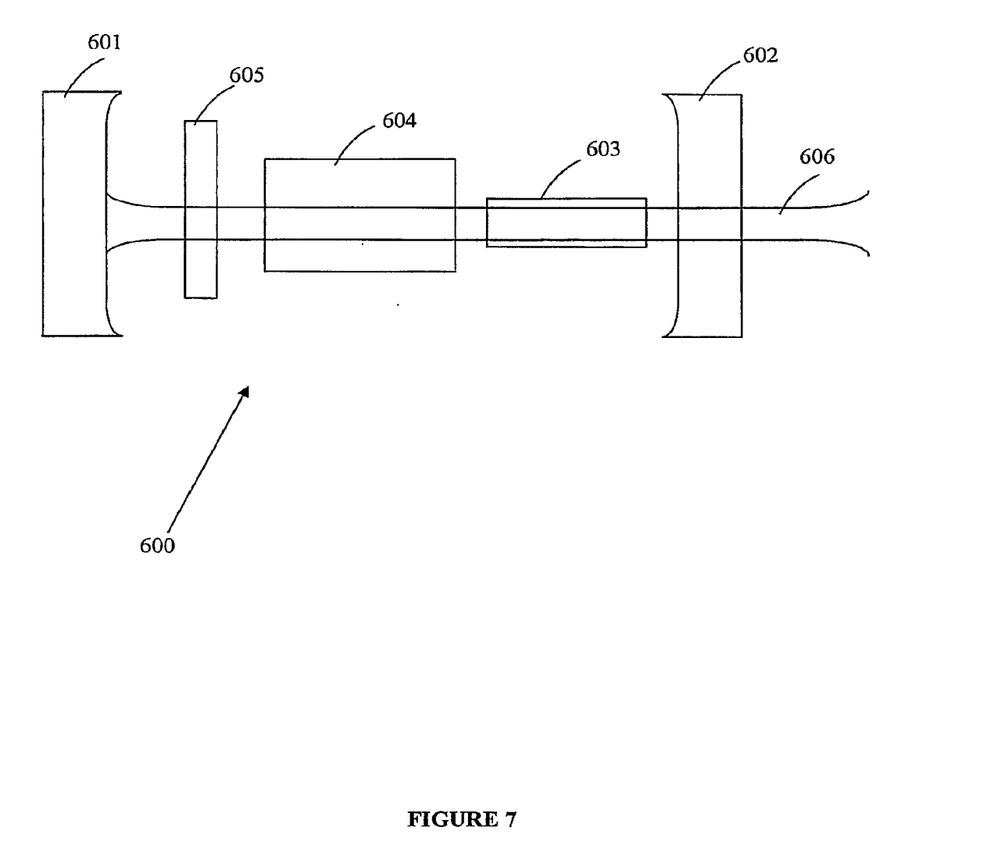
FIG. 7 shows a pulsed q-switched laser including a VHE Q-Switch according to an embodiment of the invention.

For example, FIG. 7 shows a pulsed q-switched laser 600 according to an embodiment of the invention. Pulsed laser 600 is based on a linear resonator cavity design and comprises a high reflecting back mirror 601, a partially reflecting output coupler 602, an amplifying laser material 603 and a switch comprising active VHE Q-switch 604 based on the present invention (electronic driver not shown) and optional saturable absorber 605. The Q-switch is inside the laser cavity and through switching triggered by its electronic driver allows laser 600 to provide a pulsed high power laser output 606 that consists of smooth pulses with a Fourier-Transform-Limited pulse envelope. For example, in one embodiment the amplifying laser material comprises $Er^{3+}$-YAG to provide operation at around 2.94 μm.

EXAMPLES

It should be understood that the Examples described below are provided for illustrative purposes only and do not in any way define the scope of the invention.

Experimental Results on a Prototype 2-Column Q-Switch Device

Initial experiments were carried out in order to demonstrate operation of a 2-acoustic column VHE Q-switch according to the present invention. A 1064 nm Nd:YAG laser was placed approximately two meters away in the plane of a photo-detector. The detector was re-aligned until received optical power was maximised. The two-stage VHE Q-Switch according to the present invention was installed, and driven at 68 MHz with 60 W power. Adjustments were made to device positioning and the incident beam angle, to establish the peak first order diffraction efficiency.

Applied RF drive power was varied between 0 and 60 W, with measurements of the proportional zero order intensity taken at increments of 5 W. Plots of loss modulation against RF power were described above for two VHE Q-Switch devices designated 65238-001 & 65238-002. A commercially available Single Q-Switch device (65238-003) was then introduced according to the procedure described above, and brought to ordinary Bragg diffraction at 20 W. Results for the conventional VHE/Single Q-Switch were obtained over the same power range, and a comparison made to two-stage type Q-Switch according to the present invention.

The laser was then rotated through 90° to alter the propagating beam polarisation type. A diffusing sphere was introduced in front of the detector, and the experiment conducted in darkness to compensate for the increased influence of background lighting. The test was then repeated to determine the power dependent loss modulation of the extraordinary ray by each device.

Figure 8:
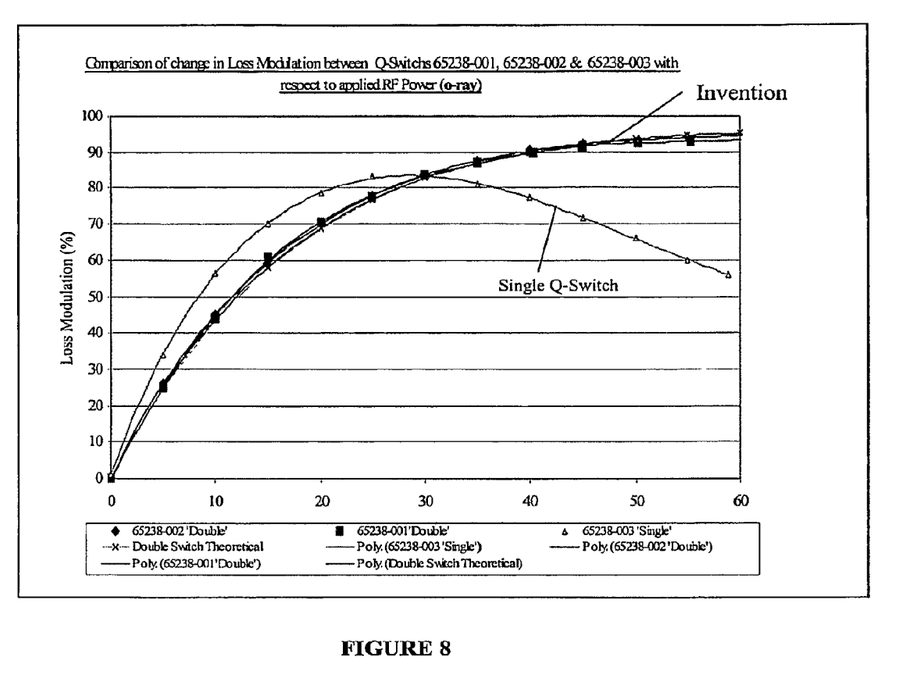
FIG. 8 shows loss modulation (y-axis) plotted against applied RF power (in Watts) for a conventional Single Q-Switch and a two-stage integrated VHE Q-Switch according to the invention.

FIG. 8 illustrates loss modulation (y-axis) against applied RF power (in Watts) for a conventional Single Q-Switch and two-stage type VHE Q-Switch according to the invention. A theoretical fit constructed from Equation 3 is also shown. In the case of ordinary polarization, good consistency is apparent between the results for the trial VHE Q-Switches. The Q-Switches according to the invention reliably achieved a loss modulation of up to 94.0+/−0.5% at 60 W. By contrast, the conventional Single Q-Switch exhibits best performance at ≈25 W, 81.0+/−1.0% LM, in accordance with the device geometry.

For RF powers greater than ~20 W, driver instability proved a significant source of error. Fluctuations of up to +/−0.5 W were observed at peak power 60 W. Especially affected were loss modulation measurements for the conventional single Q-Switch, where response to a change in power was more pronounced. Further limits were also imposed by photo-detector precision, and variations in ambient lighting. The latter was estimated to contribute an error of up to +/−0.5%, which dominated in VHE Q-Switch measurements at close to peak RF power.

The observed change in device performance following rotation of the beam polarisation to the extraordinary wave agrees closely with theory. A scaling factor was introduced into the loss modulation RF power response; reaching comparable diffraction efficiencies to the ordinary state requires significantly more power. Hence the VHE Q-Switch according to the invention modulates the extraordinary beam relatively linearly over the first 60 W (the highest power supplied by the RF driver).

Theoretical models were constructed, and results illustrated graphically in FIG. 8, by consideration of the device diffraction efficiency ($\eta$) from general AO theory:

$$\eta = \alpha \sin^2 \sqrt{\frac{\pi^2 L M_2 P}{2 H \lambda^2}} \tag{8}$$

Where $\alpha$ is a scaling factor, derived from the device parameters, which is not dependent on power. The factor $\alpha$ represents heuristically the effect of finite Q-value of the Bragg type diffraction—some power is lost into unmeasured orders. A best-fit $\alpha$-value of 0.79 was assumed, which provided a good correlation with both the ordinary and extraordinary power response curves.

The theoretical Bragg angle for fused silica diffracting at 68 MHz is calculated to be 6.27 mrad. Fitting a moving average to the change in $\eta$ with respect to incident beam angle (FIG. 9), the positions of loss modulation minima and maxima were found, relative to the device peak loss modulation. Hence, an independent experimental estimate for the VHE Q-Switch Bragg angle were $\theta_B$=6.5+/−1.0 mrad. In another closely related experiment, $\theta_B$ was found to be 5.75+/−0.37 mrad. These results compare favorably with the theoretical values obtained.

Figure 9:
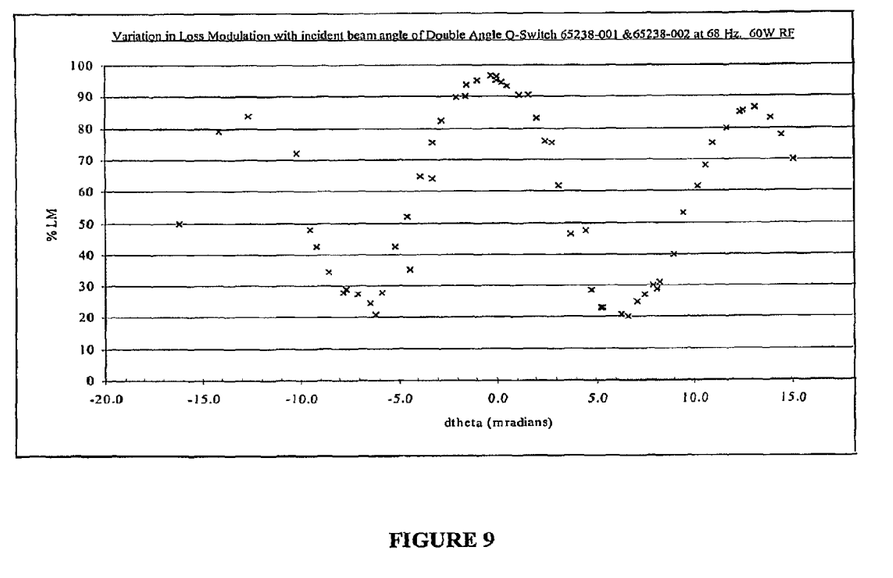
FIG. 9 shows loss modulation (y-axis) plotted against incident angle for a two-stage integrated Q-Switch according to the invention operated at 60 W and 68 MHz.

FIG. 9 evidence several distinctive features. An asymmetry is apparent between the magnitudes of each secondary peak. Deviation of the incident beam angle (towards) the transducer yields a higher loss modulation than is present at the opposite angular distance. The variation may be introduced by the asymmetrical geometry of the inventive Q-Switch (see FIG. 3). Alternatively, in view of the device height sensitivity discussed below, a fractional tilt on the device mount axis relative to the plane of the detector could have displaced the beam position from its defined axis of propagation through the cell, reducing the diffraction efficiency.

Devices according to the invention also display unusually high ratios between the magnitudes of the primary and secondary diffraction peaks. The maximum loss modulation in the secondary peak is ~84%, which is comparable to that yielded by the primary on the single transducer. It is therefore likely that at angles greater than $\theta_B$ acousto-optic matching occurs only with one of the two acoustic beams, and hence response similar to that of a conventional single Q-Switch will be observed.

Summary of Experimental Results Conducted on a 2-Stage VHE Q-Switch

Performance of VHE Q-Switches according to the invention have been examined at 68 MHz with respect to applied RF power 0 to 60 W (FIG. 8), optical polarisation states and incident angle (FIG. 9), using a Nd:YAG laser. The polarisation states used were linear polarisation states, one in which the optical polarization is parallel to the direction of the acoustic wave direction, the other is perpendicular to it. These two extreme cases will give slightly different although generally acceptable results, the difference depending on the material used. In general, of course, one chooses the polarisation so as to make use of the more favourable of the two configurations (i.e. the one in which most loss modulation is produced for a given RF drive power). Choosing the polarisation is not always possible (some lasers do not emit a well-controlled polarisation state), thus it is essential to have an idea of the two extremes likely to be encountered, to make sure the device will always work satisfactorily.

Of these parameters, device loss modulation efficiency was shown to be dependent on both the orientation and height position of the propagating beam within the cell. Values for the Bragg angle were obtained as 6.5+/−1.0 mrad and 5.75+/−0.37 mrad by mechanical and optical angular measurements respectively, giving an average $\theta_B=6.13+/-0.53$ mrad. These results are in good agreement with the calculated theoretical Bragg angle, $\theta_B=6.27$ mrad. All angles were measured relative to the position of the Q-Switch when aligned for peak loss modulation, visually apparent to be at normal incidence as theoretically predicted. Reflecting a 640 nm beam directly from the optic cell facing would allow experimental confirmation of this assumption.

Peak loss modulation of the VHE Q-Switch was measured as 96.0+/−0.5% at 60 W with optimum alignment and beam positions greater than 1 mm from the transducer.

Under the same conditions, a conventional control Single Q-Switch demonstrated a peak loss modulation of 81.0+/−1.0% at ~25 W. A loss modulation of 81.0+/−1.0% from the primary transducer implies 19% incident power on the second acoustic wave. With a further 81% loss from the secondary acoustic wave, the resultant loss modulation for the full VHE Q-Switch should therefore be 96.4+/−1.7%. This is in excellent agreement with the experimentally measured data.

It is to be understood that while the invention has been described in conjunction with the preferred specific embodiments thereof, that the foregoing description as well as the examples which follow are intended to illustrate and not limit the scope of the invention. In particular, in the description of the invention as a Q-switch, by necessity, the Q-switch is placed inside the laser cavity. However, as noted above switches according to the invention may also be used as an external modulator. In this external arrangement, the laser is run continuously; the modulator and resulting modulation is accomplished outside of the laser cavity.

What is claimed is:

1. An acousto-optic modulator, comprising:
a monolithic acousto-optic (AO) medium having first and second angled faces;
a plurality of spaced apart acoustic transducers comprising a first and at least a second transducer both bonded and positioned on said first and second angled faces of said (AO) medium to define first and second acoustical columns in which first and second acoustic beams, respectively, travel in said AO medium,
wherein an incident optical beam encounters the acoustic beam produced by each of said transducers sequentially on its passage through said modulator,
wherein said transducers are oriented so that a first order diffracted ray from the first acoustical column enters the second acoustical column at an angle of incidence that is outside the acceptance angle $\theta_a$ of said second acoustic column, and a zero order ray passed by the first acoustical column enters the second acoustical column at an angle of incidence that is inside θa of said second acoustic column, said θa defining a range of incident angles at which a diffraction efficiency for said first order diffracted ray is >50% in said second acoustical column, and
wherein said transducers are oriented so that an incident angle of an emerging optical beam from said first acoustical column relative to said second acoustical column is such that the condition $\theta_a \leq 4\theta_B$ is satisfied, wherein $\theta_B$ is the Bragg angle.

2. The modulator of claim 1, wherein said modulator provides at least a 90% single pass peak loss modulation.

3. The modulator of claim 1, wherein an incident angle of said emerging optical beam relative to said second acoustical column passes through one of the zeros in the sin $c^2$ function that defines said acceptance angle θa.

4. The modulator of claim 1, further comprising a third transducer disposed between said first and said second transducer bonded to said AO medium to form a third acoustical column, wherein said first and said second acoustical columns are aligned to operate in the Bragg regime, while said third acoustical column is aligned to operate in the Raman-Nath regime.

5. The modulator of claim 1, further comprising a third and a fourth transducer bonded to said AO medium to form a third and a fourth acoustical column, all of said acoustical columns operating substantially in the Bragg regime.

6. The modulator of claim 1, wherein said acousto-optic medium comprises amorphous silica.

7. The modulator of claim 1, wherein said acousto-optic medium comprises a single crystal, said single crystal comprising, tellurium dioxide, quartz or silicon.

8. A Q-switched laser, comprising:
a resonator cavity comprising a high reflecting back mirror;
a partially reflecting output coupler,
an amplifying laser material between said back mirror and said output coupler, and
an acousto-optic modulator disposed on either side of said amplifying material between said back mirror and said output coupler, said modulator comprising:
a monolithic acousto-optic medium;
a plurality of spaced apart acoustic transducers comprising a first and at least a second transducer both bonded and positioned on said monolithic acousto-optic medium to form first and second acoustical columns, said first and second transducers aligned so that an incident optical beam encounters the acoustic beam produced by each of said transducers sequentially on its passage through said modulator,
wherein said transducers are oriented so that a first order diffracted ray from the first acoustical column enters the second acoustical column at an angle of incidence that is outside the acceptance angle ($\theta_a$) of said second acoustic column, and a zero order ray passed by the first acoustical column enters the second acoustical column at an angle of incidence that is inside $\theta_a$ of said second acoustic column, said $O_a$ defining a range of incident angles at which a diffraction efficiency for said diffracted ray is >50% in said second acoustical column, and
wherein said transducers are oriented so that an incident angle of an emerging optical beam from said first acoustical column relative to said second acoustical column is such that the condition $\theta_a \leq 4\theta_B$ is satisfied, wherein $\theta_B$ is the Bragg angle.

9. The laser of claim 8, wherein said modulator provides at least a 90% single pass peak loss modulation.

10. The laser of claim 8, wherein said angle of incidence passes through one of the zeros in the sin $c^2$ function that defines said acceptance angle θa.

11. The laser of claim 8, further comprising a third transducer disposed between said first and said second transducer bonded to said AO medium to form a third acoustical column, wherein said first and said second acoustical columns are aligned to operate in the Bragg regime, while said third acoustical column is aligned to operate in the Raman-Nath regime.

12. The laser of claim 8, further comprising a third and a fourth transducer bonded to said AO medium to form a third and a fourth acoustical column, all of said acoustical columns operating substantially in the Bragg regime.

13. The laser of claim 8, wherein said plurality of transducers comprise piezoelectric transducers.

14. The laser of claim 8, further comprising a single RF driver for driving both said transducers.

* * * * *